US012769571B2

(12) United States Patent
Nakaide et al.

(10) Patent No.: US 12,769,571 B2
(45) Date of Patent: Oct. 20, 2026

(54) CONTROLLER VIRTUALIZATION DEVICE AND CONTROL SYSTEM

(71) Applicant: MITSUBISHI HEAVY INDUSTRIES, LTD., Tokyo (JP)

(72) Inventors: Minoru Nakaide, Tokyo (JP); Shinichi Toda, Kanagawa (JP); Kiyoshi Ishii, Hyogo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 620 days.

(21) Appl. No.: 18/022,651

(22) PCT Filed: Oct. 19, 2021

(86) PCT No.: PCT/JP2021/038508
§ 371 (c)(1),
(2) Date: Feb. 22, 2023

(87) PCT Pub. No.: WO2022/085651
PCT Pub. Date: Apr. 28, 2022

(65) Prior Publication Data

US 2023/0325229 A1 Oct. 12, 2023

(30) Foreign Application Priority Data

Oct. 20, 2020 (JP) ................................ 2020-176208

(51) Int. Cl.
*G06F 9/455* (2018.01)
*G05B 9/03* (2006.01)
(Continued)

(52) U.S. Cl.
CPC ........... *G06F 9/45558* (2013.01); *G05B 9/03* (2013.01); *G05B 19/0428* (2013.01);
(Continued)

(58) Field of Classification Search
None
See application file for complete search history.

(56) References Cited

U.S. PATENT DOCUMENTS 11,803,452 B2 * 10/2023 Toda .................. G06F 9/45558
2012/0030670 A1 2/2012 Vijay et al.
(Continued)

FOREIGN PATENT DOCUMENTS

CN 1945480 4/2007
CN 203759492 8/2014
(Continued)

OTHER PUBLICATIONS

Office Action issued Aug. 2, 2025 in corresponding Chinese Patent Application No. 202180062037.5, with English translation.
(Continued)

*Primary Examiner* — Qing Yuan Wu
(74) *Attorney, Agent, or Firm* — Wenderoth, Lind & Ponack, L.L.P.

(57) ABSTRACT

A controller virtualization device includes: a plurality of controller virtualization devices each configured to generate a control signal for a control object and including at least one virtual machine; and at least one OT line for transmitting the control signal from each of the plurality of controller virtualization devices to the control object. The plurality of controller virtualization devices are configured to mutually transmit and receive an existence confirmation signal or a reliability confirmation signal of the virtual machine via the at least one OT line.

10 Claims, 7 Drawing Sheets

(51) Int. Cl.
*G05B 19/042* (2006.01)
*G05B 23/02* (2006.01)
*G06F 11/20* (2006.01)

(52) U.S. Cl.
CPC ......... *G05B 23/0205* (2013.01); *G06F 9/455* (2013.01); *G06F 11/20* (2013.01); *G06F 11/2002* (2013.01); *G06F 11/2005* (2013.01); *G06F 11/2007* (2013.01); *G06F 11/202* (2013.01); *G06F 11/2023* (2013.01); *G06F 2009/45591* (2013.01)

(56) References Cited

U.S. PATENT DOCUMENTS

2018/0109472 A1 4/2018 Kubota et al.
2018/0321662 A1 11/2018 Nixon et al.
2021/0311453 A1* 10/2021 Li ...................... G05B 19/4063
2022/0417136 A1* 12/2022 Chen ...................... H04L 45/28

FOREIGN PATENT DOCUMENTS

CN 107534602 1/2018
JP 2002-305520 10/2002
JP 5851503 2/2016
JP 2020-518921 6/2020
WO WO-2021046565 A2 * 3/2021 ............. H04L 45/28

OTHER PUBLICATIONS

International Search Report issued Jan. 11, 2022 in International Application No. PCT/JP2021/038508.
Office Action issued May 1, 2025 in corresponding Chinese Application No. 202180062037.5, with machine translation.

* cited by examiner

CONTROLLER VIRTUALIZATION DEVICE AND CONTROL SYSTEM

TECHNICAL FIELD

The present disclosure relates to a controller virtualization device and a control system.

This application claims the priority of Japanese Patent Application No. 2020-176208 filed on Oct. 20, 2020, the content of which is incorporated herein by reference.

BACKGROUND

For example, a distributed control system (DCS) in which control functions are distributed to a plurality of control panels corresponding to each device is known as a control system for controlling a plant including various devices. The distributed control system suffers from a high manufacturing cost due to the scale of the configuration across the plurality of control panels. In order to solve such problem, a virtualization technology is used to independently run an application in each of a plurality of virtual machines (VMs) in a controller virtualization device in which the virtual machines are installed on a single physical controller, making it possible to realize the distributed control system with low manufacturing cost.

The control system including this type of controller virtualization device requires real-time performance, and further requires availability capable of stably maintaining a control function even when a failure occurs. The real-time performance can be implemented by making virtualization software (hypervisor) real-time and installing a real-time OS (Operating System) as an OS on the virtual machine. Meanwhile, high availability generally makes a physical controller redundant, in case of random hardware failures. The redundant configuration includes an active device for actually outputting a control signal to a control object, and a standby device having the same configuration as the active device, and if a failure occurs in the active device, the control function is maintained by switching to the standby device in a unit of a control cycle (for example, millisecond).

As the control system including the controller virtualization device thus utilizing the virtualization technology, for example, Patent Document 1 is known. In Patent Document 1, an operating state of each application running on a virtual machine is monitored by sending a heartbeat message, which is an existence confirmation signal, and the virtual machine is restarted if a response to the heartbeat message is not appropriately obtained.

CITATION LIST

Patent Literature

Patent Document 1: JP5851503B

SUMMARY

Technical Problem

In order to achieve high availability as described above, in a redundant or multiplexed configuration including the active device and the standby device, device switching at the time of occurrence of a failure has been performed by mutually transmitting and receiving an existence confirmation signal such as that in Patent Document 1 described above via a general-purpose network such as Ethernet (registered trademark) for connecting between the active device and the standby device. However, if connection cables configured by directly being connected to the general-purpose network such as Ethernet (registered trademark) has a failure such as disconnection, or if one of the connection cables is disconnected from a connector, a link state of both connectors is broken. In this case, depending on a transmission/reception result of the existence confirmation signal, both systems become active devices and control output signals (hereinafter, simply referred to as "control signals") conflict with each other, both the systems become standby devices and thus there is no active device, or the like, which may make it difficult to continue stable control.

At least one aspect of the present disclosure has been made in view of the above, and an object of the present disclosure is to provide a controller virtualization device and a control system that can stably control the control object regardless of a failure occurrence mode and can stably be supplied for a long term at low cost while having excellent high availability.

Solution to Problem

In order to solve the above-described problems, a controller virtualization device according to at least one aspect of the present disclosure includes: a plurality of controller virtualization devices each configured to generate a control signal for a control object and including at least one virtual machine; and at least one OT (Operational Technology: control/operational technology) network communication line (hereinafter, simply referred to as "OT line") for transmitting the control signal from each of the plurality of controller virtualization devices to the control object. The plurality of controller virtualization devices are configured to mutually transmit and receive an existence confirmation signal or a reliability confirmation signal of the virtual machine via the at least one OT line.

Advantageous Effects

According to at least one aspect of the present disclosure, it is possible to provide a controller virtualization device and a control system that can stably control a control object regardless of a failure occurrence mode and can stably be supplied for a long term at low cost while having excellent high availability.

DETAILED DESCRIPTION

Figure 1:
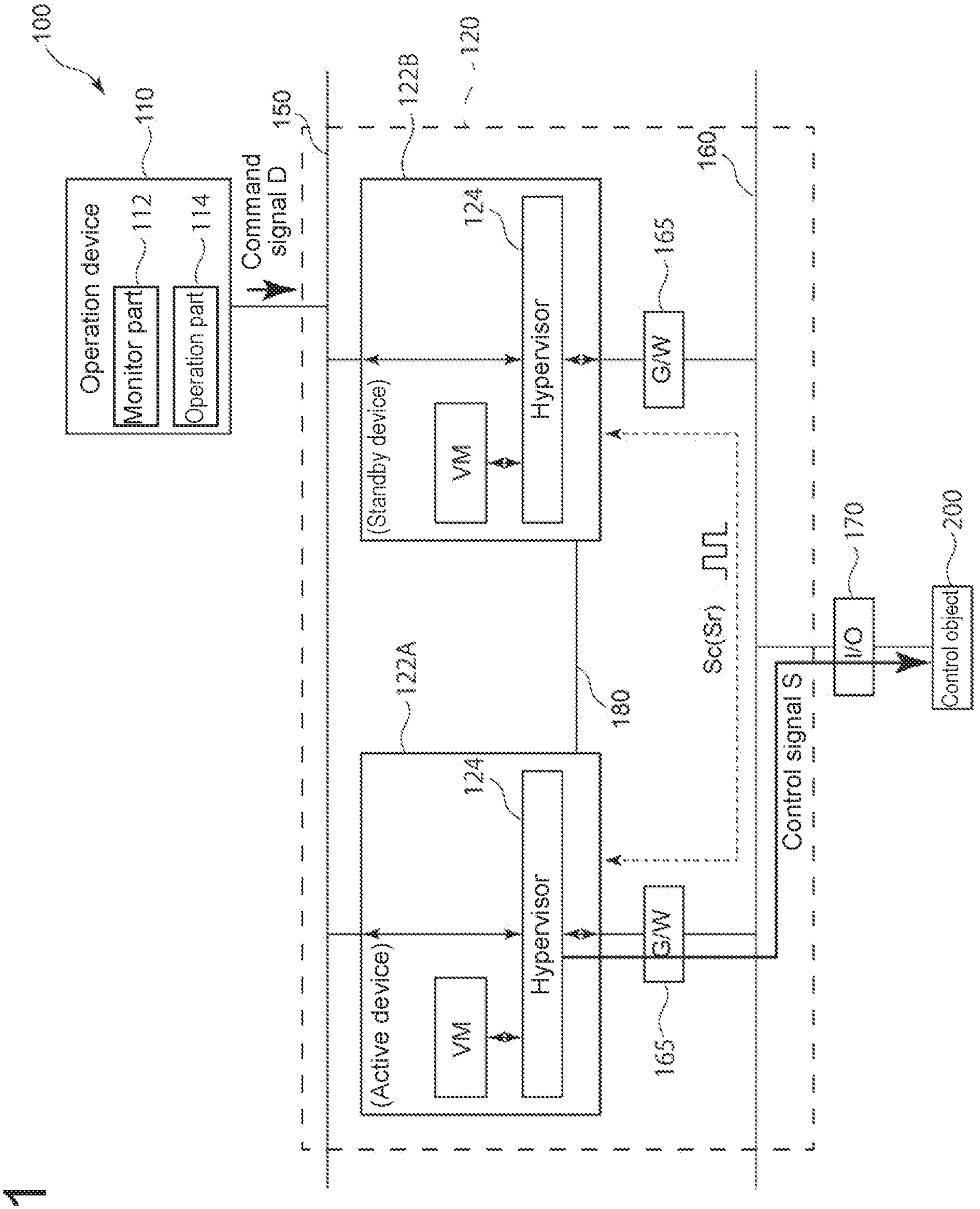
FIG. 1 is an overall configuration diagram of a control system according to the first embodiment.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

FIG. 1 is an overall configuration diagram of a control system 100 according to the first embodiment. The control system 100 is a system for controlling a control object 200 based on an operator's operation. The control object 200 can include any device that can be controlled based on a control signal S output from the control system 100, but in the present embodiment, a plant composed of various devices will be described as an example. The plant is, for example, a power generation plant (such as a thermal power plant, a nuclear power plant, a hydroelectric power plant, a wind power plant, or the like).

The control system 100 includes an operation device 110 that can be operated by an operator, and a controller virtualization device 120 capable of generating a control signal for controlling the control object 200 based on the input from various sensor inputs from the control object 200, an internal state of a control logic, and an input from the operation device 110.

In the following embodiment, the control system 100 for controlling the control object 200 based on the operator's operation will be described. However, the present invention is also applicable to a control system for automatically controlling the control object 200 without based on the operator's operation. In this case, the control system 100 has a configuration for generating a command signal D instead of the operation device 110, and the operation device 110 is unnecessary.

The operation device 110 receives the operator's operation and generates the command signal D to the controller virtualization device 120 based on operation contents. In the present embodiment, the operation device 110 includes a monitor part 112 for monitoring the state of the control object 200, and an operation part 114 for receiving the operator's operation. The monitor part 112 has a function of displaying the state of the control object 200 in a manner recognizable by the operator, and is, for example, a display device such as a display. The operator can operate the operation part 114 based on a monitoring result (for example, the state of the control object 200 displayed on the display) by the monitor part 112. The operation part 114 receives a command input operation by the operator, for example, thereby generating the command signal D corresponding to the operation contents.

The operation device 110 is connected to the controller virtualization device 120 via an IT (Information Technology) network (hereinafter, simply referred to as the "IT network") 150. The IT network 150 is a communication path for performing data communication under time constraints that are relatively free relative to time constraints on an OT line, such as monitoring of an internal signal of a control device, data recording (log), or signal communication with another device. The command signal D from the operation device 110 is transmitted to the controller virtualization device 120 via the IT network 150.

The controller virtualization device 120 generates the control signal S based on the command signal D transmitted via the IT network 150. The controller virtualization device 120 includes a plurality of controller virtualization devices capable of generating the control signals S. In the present embodiment, a case where the controller virtualization device 120 includes two controller virtualization devices 122A, 122B will be described as an example. However, the controller virtualization device 120 may include at least three controller virtualization devices (for example, see FIG. 5 which will be described later).

Each of the controller virtualization devices 122A 122B includes, for example, an electronic computation device including electronic components such as a central processing unit (CPU), as a hardware configuration. By executing virtualization software in a hypervisor 124 of the electronic computation device, a VM representing at least one virtual machine (hereinafter, simply referred to as the "VM") is mounted. In the present embodiment, each of the controller virtualization devices 122A, 122B is mounted with one VM. The VM is configured by executing the virtualization software, and has a function of virtually simulating each control panel corresponding to one of the devices composing the control object 200 in a distributed control system, for example.

Herein, while the life cycle of the control object 200 such as a plant extends for a long period of several tens of years, in recent years, the version upgrade cycle (life cycle) of the electronic component composing the electronic computation device has been shortened to about several years. Conventionally, the controller virtualization device 120 is generally equipped with dedicated embedded software specialized for the hardware configuration. However, if a design change occurs due to the end of life (EOL) of a previous version of the hardware configuration, it is necessary to change the design of software specialized for the hardware configuration. As a result, there has been a problem of increased development cost or version control burden associated with the design change.

In the controller virtualization device 122A, 122B of the present embodiment, such problem can suitably be solved by configuring the virtual machine VM with the hypervisor 124 which is the virtualization software. That is, even if the hardware configuration of the controller virtualization device 122A, 122B is changed in design, hardware architecture seen from the VM via the hypervisor 124 is standardized, making it unnecessary to change the design of the VM itself and resulting in less development cost or version control burden.

Further, as will be described later, by executing the virtualization software in the hypervisor 124, it is possible to mount a plurality of VMs on a single piece of hardware. Thus, for example, compared to the conventional distributed control system including the plurality of control panels for each device composing the plant, individual controller functions are aggregated on the same controller virtualization device while maintaining functional independence by the conventional distributed control system, making it possible to realize a distributed control system in which hardware is aggregated and making it possible to effectively suppress the cost.

The controller virtualization device 120 has a redundant configuration by including the plurality of controller virtualization devices 122A, 122B, and has high availability. These two controller virtualization devices 122A, 122B mutually transmit and receive an existence confirmation signal Sc which is a so-called heartbeat signal, thereby being selected as an active device or a standby device according to their operating states. FIG. 1 illustrates a case where the control signal S is generated by selecting the controller virtualization device 122A as the active device and the remaining controller virtualization device 122B is controlled to be in a standby state in which the control signal S is not generated by selecting the controller virtualization device 122B as the standby device.

The existence confirmation signal Sc is communication data for confirming the mutual operating states by being mutually transmitted and received between the plurality of controller virtualization devices 122A and 122B. As one aspect of the existence confirmation signal Sc, for example, transmission data with a data header including a corresponding destination address is transmitted from the controller virtualization device 122A on one side to the controller virtualization device 122B on another side, and response data output by the controller virtualization device 122B on the another side having received the transmission data is received by the controller virtualization device 122A on the one side, allowing the controller virtualization device 122A on the one side to confirm whether the controller virtualization device 122B on the another side exists healthy. Likewise, transmission data with a data header including a corresponding destination address is transmitted from the controller virtualization device 122B on the another side to the controller virtualization device 122A on the one side, and response data output by the controller virtualization device 122A on the one side having received the transmission data is received by the controller virtualization device 122B on the another side, allowing the controller virtualization device 122B on the another side to confirm whether the controller virtualization device 122A on the one side exists healthy.

The existence confirmation signal Sc can take various known forms other than the form of mutual information acquisition by the request-response type two-way communication as described above, and may take a form in which, for example, both sides periodically keep outputting heartbeat signals, and mutually receive and monitor the heartbeat signals transmitted from the other.

Such existence confirmation signal Sc can include various kinds of information. For example, the existence confirmation signal Sc may include an operating state (active/standby/initializing/out-of-order, etc.) or an operation counter of the controller virtualization device 122A, 122B, or an operating state (active/standby/initializing/out-of-order, etc.) or an operation counter of each VM in the controller virtualization device 122A, 122B.

The controller virtualization device 122A, which is the active device, generates the control signal S for the control object 200, while the controller virtualization device 122B, which is the standby device, does not generate the control signal S (as another aspect, by providing a valid flag in a communication packet of the control signal S, even the standby device may be configured to generate and transmit the control signal S that does not raise the valid flag, thereby outputting an actual output command only from the active device). As a result, in the controller virtualization device 120, the control signals from the two controller virtualization devices 122A, 122B do not conflict with each other, and the control signal S generated by the controller virtualization device 122A, which is the active device, is output from a gateway device 165 to an input/output device 170 via an OT line 160. The input/output device 170 receives the control signal S from the controller virtualization device 122A, which is the active device, and outputs the control signal S to the control object 200.

In the controller virtualization device 120 having such redundant configuration, if a failure (for example, disconnection of a connection cable on a path including the controller virtualization device 122A and the OT line 160, breakdown of a communication chip or a communication device connected to the path, etc.) occurs on the side of the controller virtualization device 122A which is the active device, the controller virtualization device 122A, which has been the active device, is withdrawn from control by being switched to the standby device, whereas the controller virtualization device 122B, which has been the standby device, is switched to the active device. As a result, even when the failure occurs, the control of the control object 200 is stably maintained by using the controller virtualization device 122B side where no failure is occurring.

Meanwhile, conventionally, such transmission and reception of the existence confirmation signal Sc between the plurality of controller virtualization devices 122A and 122B has been performed via an inter-device connection network 180 connecting these controller virtualization devices 122A and 122B or the general-purpose network such as Ethernet (registered trademark) as the aforementioned IT network 150. In this case, when the failure occurs in each controller virtualization device 122A, 122B, in order to realize real-time performance for performing switching between the active device and the standby device in a short time (for example, in a unit of milliseconds which is the control cycle of the central processing unit included in the hardware configuration), a dedicated switching circuit using an FPGA or the like has been used. However, such dedicated switching circuit also needs to be updated according to the version upgrade cycle of the electronic component used in the controller virtualization device 122A, 122B, and in the end of life (EOL) of the previous version, this is one of factors of an increase in development cost of a design change for dealing with the end of life (EOL) of the previous version.

Further, if connection cables configured by directly being connected to the general-purpose network such as Ethernet (registered trademark) has the failure such as disconnection, or if one of the connection cables is disconnected from a connector, a link state of both connectors is broken. In this case, depending on a transmission/reception result of the existence confirmation signal Sc, both of the controller virtualization devices 122A, 122B become the active devices and the control signals conflict with each other, both the controller virtualization devices 122A, 122B become the standby devices and thus there is no active device, or the like, which may make it difficult to continue stable control.

In order to solve such problem, in the present embodiment, it is configured such that transmission of the existence confirmation signal Sc between the plurality of controller virtualization devices 122A and 122B is performed via the OT line 160.

Figure 2:
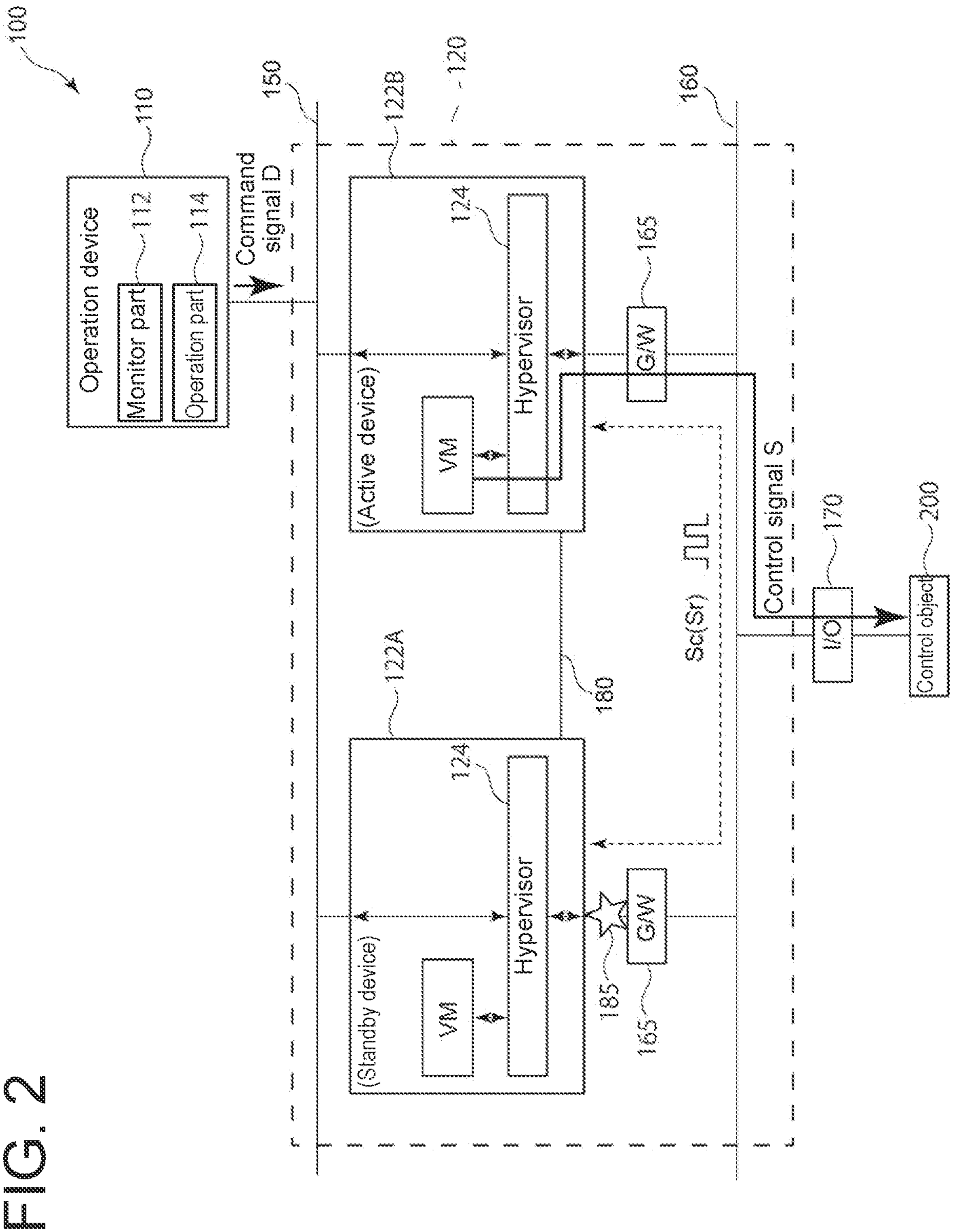
FIG. 2 is a diagram showing a state when a failure occurs on one controller virtualization device side in the control system of FIG. 1.

Herein, FIG. 2 is a diagram showing a state when the failure occurs on the controller virtualization device 122A side in the control system 100 of FIG. 1, in the present example, until immediately before the failure occurs, as shown in FIG. 1, the controller virtualization device 122A is the active device and the controller virtualization device 122B is controlled as the standby device, and FIG. 2 shows the state where a location of failure 185 (disconnection, etc.) occurs on the connection cable that constitutes the OT line 160 between the controller virtualization device 122A and the input/output device 170. In this case, the existence confirmation signal Sc transmitted from the controller virtualization device 122A via the OT line 161) is interrupted by the location of failure 185. Consequently, as shown in FIG. 2, the controller virtualization device 122A, which is the active device, recognizes its own failure and switches to the standby device, and the controller virtualization device 122B, which has been the standby device, switches to the active device, thereby maintaining the control of the control object.

With such configuration, by switching the plurality of controller virtualization devices 122A, 122B to the active device or the standby device based on the existence confirmation signal Sc mutually transmitted via the OT line 160, the control of the control object 200 can suitably be maintained even when the failure occurs. For example, if the connection cable directly connecting between the plurality of controller virtualization devices 122A and 122B such as the inter-device connection network 180 independent of the OT line 160 is used as a line for exchanging the existence confirmation signal Sc, there is a possibility that the plurality of controller virtualization devices 122A, 122B mutually output the control signals Sc and the control becomes unstable. By contrast, in the present configuration, since the existence confirmation signal Sc is mutually transmitted between the plurality of controller virtualization devices 122A and 122B via the OT line 160, in case the OT line 160 is disconnected, the control signal Sc is not output from the controller virtualization device on the side of the disconnection location due to physical interruption, making it possible to effectively prevent the above-described possibility. Further, since the OT line 160 uses a general-purpose high-speed communication network such as a gigabit Ethernet network, the conventionally used dedicated switching circuit such as the FPGA becomes unnecessary, and even if the end of life (EOL) of the previous version due to the version upgrade cycle occurs in the electronic component which is the hardware configuration composing the controller virtualization device 122A, 122B, it is possible to effectively reduce the development cost associated with the design change.

Figure 3:
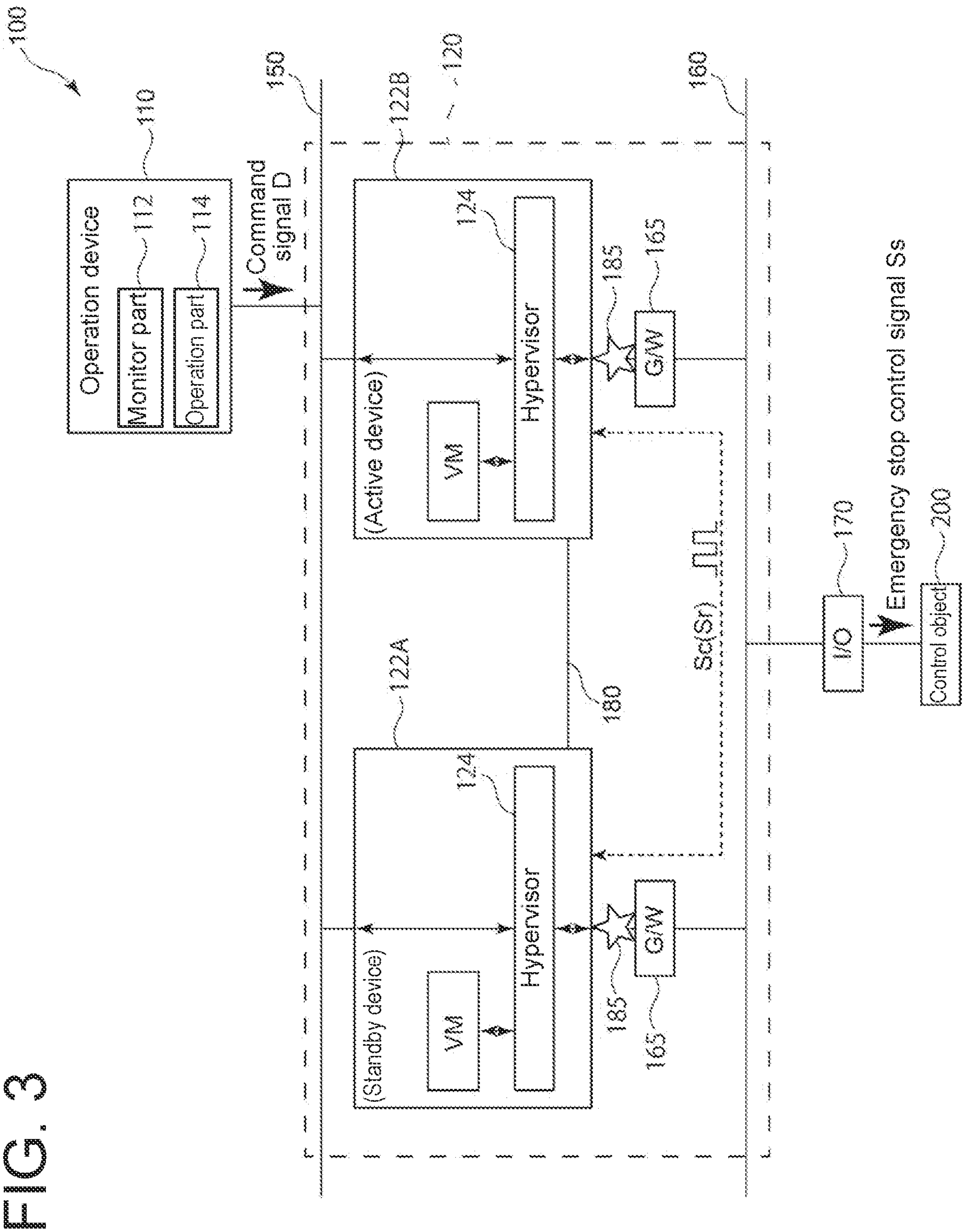
FIG. 3 is a diagram showing a state when failures occur on both controller virtualization devices in the control system of FIG. 1.

If the failures occur in both the two controller virtualization devices 122A, 122B, as shown in FIG. 3, the controller virtualization device 120 switches both the controller virtualization devices 122A, 122B to the standby devices, and the input/output device 170 may output an emergency stop control signal Ss to the control object 200. The emergency stop control signal Ss is a control signal capable of performing sequence control for normally stopping the control object 200, making it possible to avoid the unintended control signal S from each controller virtualization device from being output from the control object 200 and to appropriately stop the control object 200, even if a serious situation is entered where the failures occur in both the controller virtualization devices 122A, 122B.

In the above embodiment, the case has been described in which it is configured such that the plurality of controller virtualization devices 122A, 122B are switched to the active device or the standby device based on the existence confirmation signal Sc mutually transmitted via the OT line 160. However, it may be configured such that the plurality of controller virtualization devices 122A, 122B are switched to the active device or the standby device based on a reliability confirmation signal Sr mutually transmitted via the OT line 160, instead of the existence confirmation signal Sc.

In this case, the reliability confirmation signal Sr includes information parameters regarding the reliability of the plurality of controller virtualization devices 122A, 122B, and by comparing these parameters, the reliability of each controller virtualization device may be determined or the controller virtualization device whose parameter is not less than a reference value may be determined as reliable. Whereby, with the controller virtualization device whose reliability is guaranteed being the active device, by transmitting the control signal S from said controller virtualization device to the control object, it is possible to realize the controller virtualization device 120 having a highly reliable multiplexed configuration.

As described above, the controller virtualization device 120 is configured such that the existence confirmation signal Sc or the reliability confirmation signal Sr is mutually transmitted and received between the plurality of controller virtualization devices 122A and 122B via the OT line 160. Consequently, for example, if the failure (disconnection of the cable related to a path that includes the OT line 160 and the controller virtualization device 122A, 122B outputting the control signal S to the control object 200 via the OT line 160, breakdown of the communication chip or the communication device, etc.) occurs on the path, the controller virtualization device detects the disconnection of its own control output line and leaves the control, and another controller virtualization device can instead output the control signal S for the control object via the OT line 160.

Thus, since it is configured such that the existence confirmation signal Sc or the reliability confirmation signal Sr is mutually transmitted and received between the plurality of controller virtualization devices 122A and 122B via the OT line, the dedicated circuit using the FPGA or the like becomes unnecessary, which is required when the existence confirmation signal Sc or the reliability confirmation signal Sr is mutually transmitted and received between the plurality of controller virtualization devices 122A and 122B via an IT network or an inter-device connection network connecting between the plurality of controller virtualization devices 122A and 122B. As a result, even if the electronic component constituting the hardware of the controller virtualization device 120 is forced to change the design due to the end of life (EOL) of the previous version associated with the version upgrade cycle, it is possible to effectively reduce the development cost required of the controller virtualization device 120.

Figure 4:
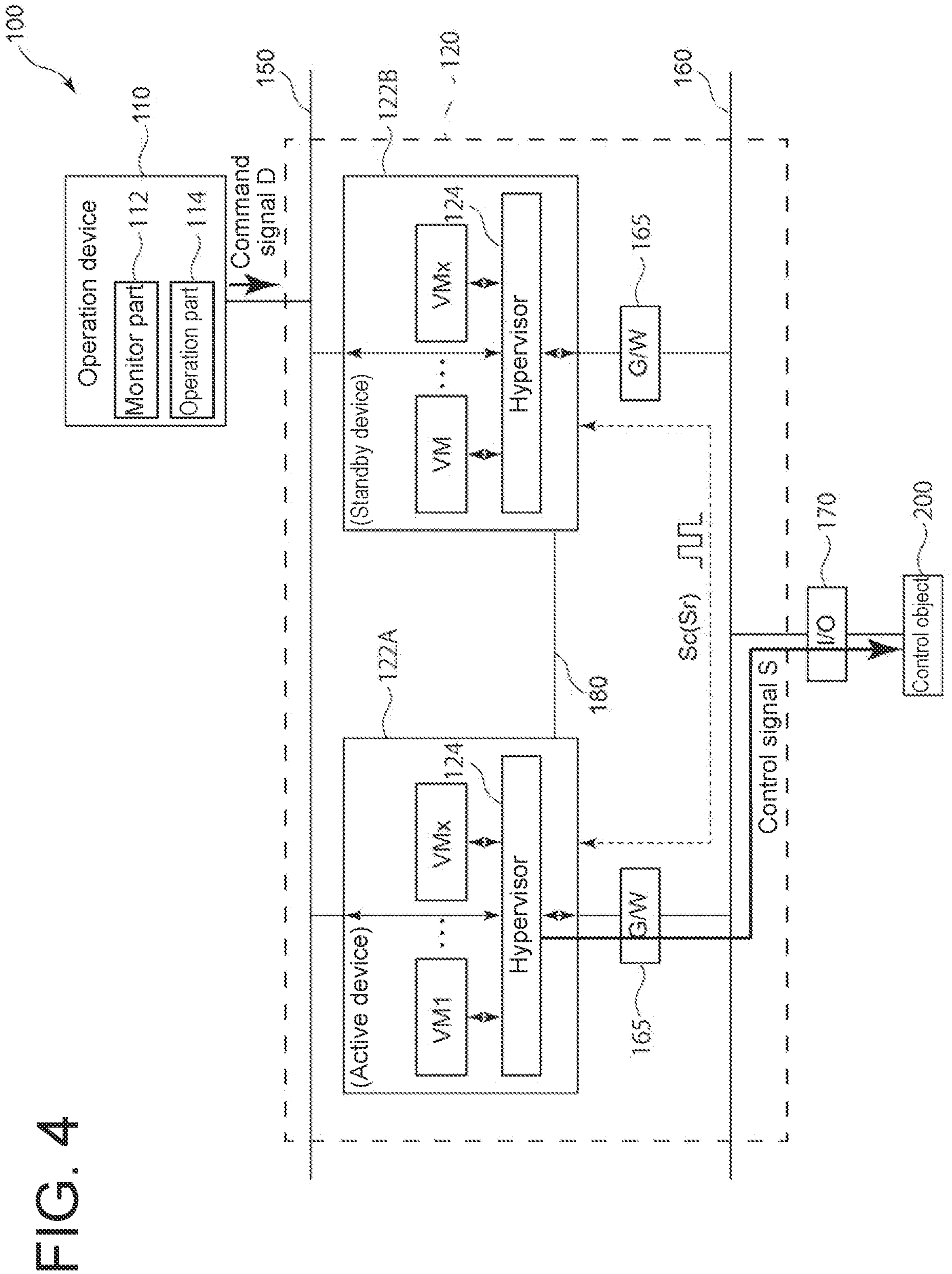
FIG. 4 is an overall configuration diagram of the control system according to the second embodiment.

FIG. 4 is an overall configuration diagram of the control system 100 according to the second embodiment. The control system 100 according to the second embodiment differs from the aforementioned embodiment in that each of the controller virtualization devices 122A, 122B has a plurality of VM1, VM2, . . . VMx. The plurality of VM1, VM2, . . . VMx are mounted by executing the virtualization software in the hypervisor 124. By thus mounting the plurality of VM1, VM2, . . . VMx in each of the controller virtualization devices 122A, 122B, it is possible to execute the independent application in the plurality of virtual machines VM even within a single piece of hardware. Such configuration is suitable, for example, for realizing the distributed control system where each device is controlled in a distributed manner with a small hardware configuration with respect to the control object 200 including various devices such as a plant.

In this case, the existence confirmation signal Sc mutually transmitted between the plurality of controller virtualization devices 122A and 122B may include an operating state (active/standby/initializing/out-of-order, etc.) or an operation counter of each of VM1, VM2, . . . , VMx of each of the controller virtualization devices 122A, 122B.

In the present embodiment, the case is exemplified in which it is controlled such that all the VMs included in one of the plurality of controller virtualization devices 122A, 122B enter the active state and all the VMs included in the other enter the standby state. However, it may be controlled such that some of the VMs included in the one of the plurality of controller virtualization devices 122A, 122B are in the active state, and some of the VMs included in the other are in the standby state and the remaining VMs are in the active state. That is, it is only necessary that each of VM1, VM2, . . . , VMx is controlled to be in the active state and the standby state in one of the plurality of controller virtualization devices 122A, 122B, and there may be no substantial meaning in distinguishing between which of the plurality of controller virtualization devices 122A, 122B is the active device and which of the plurality of controller virtualization devices 122A, 122B is the standby device.

Also in the present embodiment, as in the aforementioned embodiment, it may be configured such that the plurality of controller virtualization devices 122A, 122B are switched to the control side device or the standby device based on the reliability confirmation signal Sr instead of the existence continuation signal Sc.

As described above, according to the second embodiment, since the plurality of VM1, VM2, . . . , VMx are mounted on each of the plurality of controller virtualization devices 122A, 122B, the multifunctional control device can be aggregated and realized under the small hardware configuration, and it is possible to effectively suppress the manufacturing cost.

Figure 5:
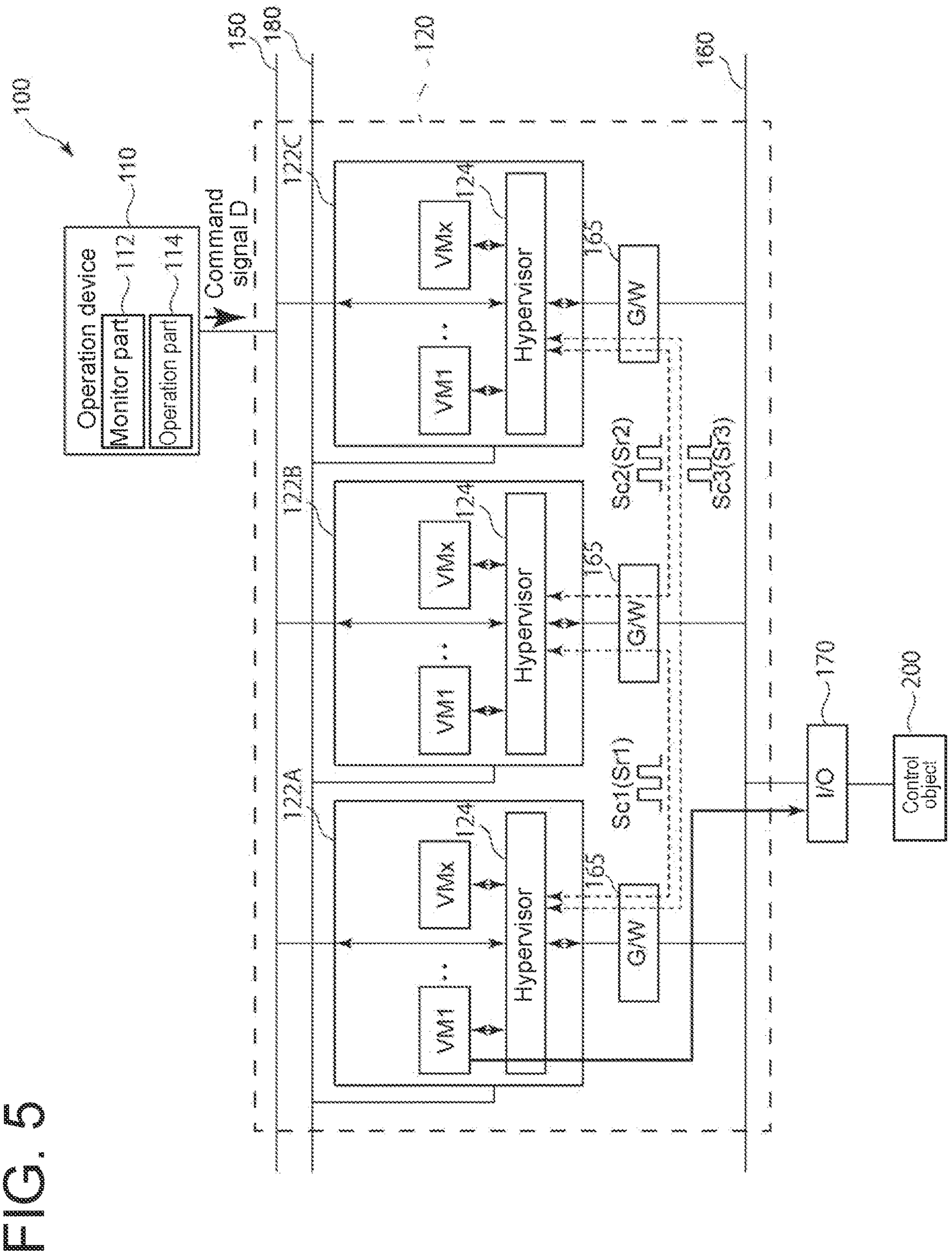
FIG. 5 is an overall configuration diagram of the control system according to the third embodiment.

FIG. 5 is an overall configuration diagram of the control system 100 according to the third embodiment. In the control system 100 according to the third embodiment, the controller virtualization device 120 includes at least three controller virtualization devices. FIG. 5 illustrates a case where the controller virtualization device 120 includes three controller virtualization devices 122A, 122B, 122C.

The three controller virtualization devices 122A, 122B, 122C are configured to receive the command signals D in parallel from the operation device 110 via the IT network 160, and to output the control signals S from the controller virtualization devices 122A, 122B, 122C to the input/output device 170 via the OT line 160.

The three controller virtualization devices 122A, 122B, 122C are configured to mutually transmit the existence confirmation signal Sc or the reliability confirmation signal Sr via the OT line 160. If the existence confirmation signal Sc is mutually transmitted through the OT line 160, the existence confirmation signal Sc is, for example, a heartbeat signal including a data header whose address is the control virtualization device of the other party, and existence is confirmed based on the response from the control virtualization device of the other party. Further, if the reliability confirmation signal Sr is mutually transmitted through the OT line 160, the reliability confirmation signal Sr includes the information parameters regarding the reliability of each of the controller virtualization devices 122A, 122B, 122C, and these information parameters are compared. As a result, the highly reliable controller virtualization device is set as the active device, and the remaining controller virtualization devices are each set as the standby device.

If the reliability confirmation signal Sr is mutually transmitted among the three controller virtualization devices 122A, 122B, 122C via the OT line 160, the reliability confirmation signal Sr includes the information parameters regarding the reliability of the plurality of controller virtualization devices 122A, 122B, 122C, and by comparing these parameters, the reliability of each controller virtualization device may be determined by so-called majority decision or the controller virtualization device whose parameter is not less than the reference value may be determined as reliable.

The existence confirmation signal Sc or the reliability confirmation signal Sr is transmitted via the OT line 160 corresponding, to any combination of the controller virtualization devices 122A, 122B, 122C included in the controller virtualization device 120. More specifically, a first existence confirmation signal Sc1 or a first reliability confirmation signal Sr1 is mutually transmitted via the OT line 160 between the controller virtualization devices 122A and 122B, a second existence confirmation signal Sc2 or a second reliability confirmation signal Sc2 is mutually transmitted via the OT line 160 between the controller virtualization devices 122B and 122C, and a third existence confirmation signal Sc3 or a third reliability confirmation signal Sr3 is mutually transmitted via the OT line 160 between the controller virtualization devices 122C and 122A.

Even in the control system 100 with the controller virtualization device 120 thus including at least three controller virtualization devices, by mutually transmitting the existence confirmation signal Sc or the reliability confirmation signal Sr via the OT line 160, it is possible to realize the control device with high functionality and excellent reliability while suppressing the manufacturing cost. Further, even if the end of life (EOL) of the previous version associated with the version upgrade cycle occurs in the electronic component constituting the hardware, it is possible to effectively reduce the development cost associated with the design change.

Figure 6:
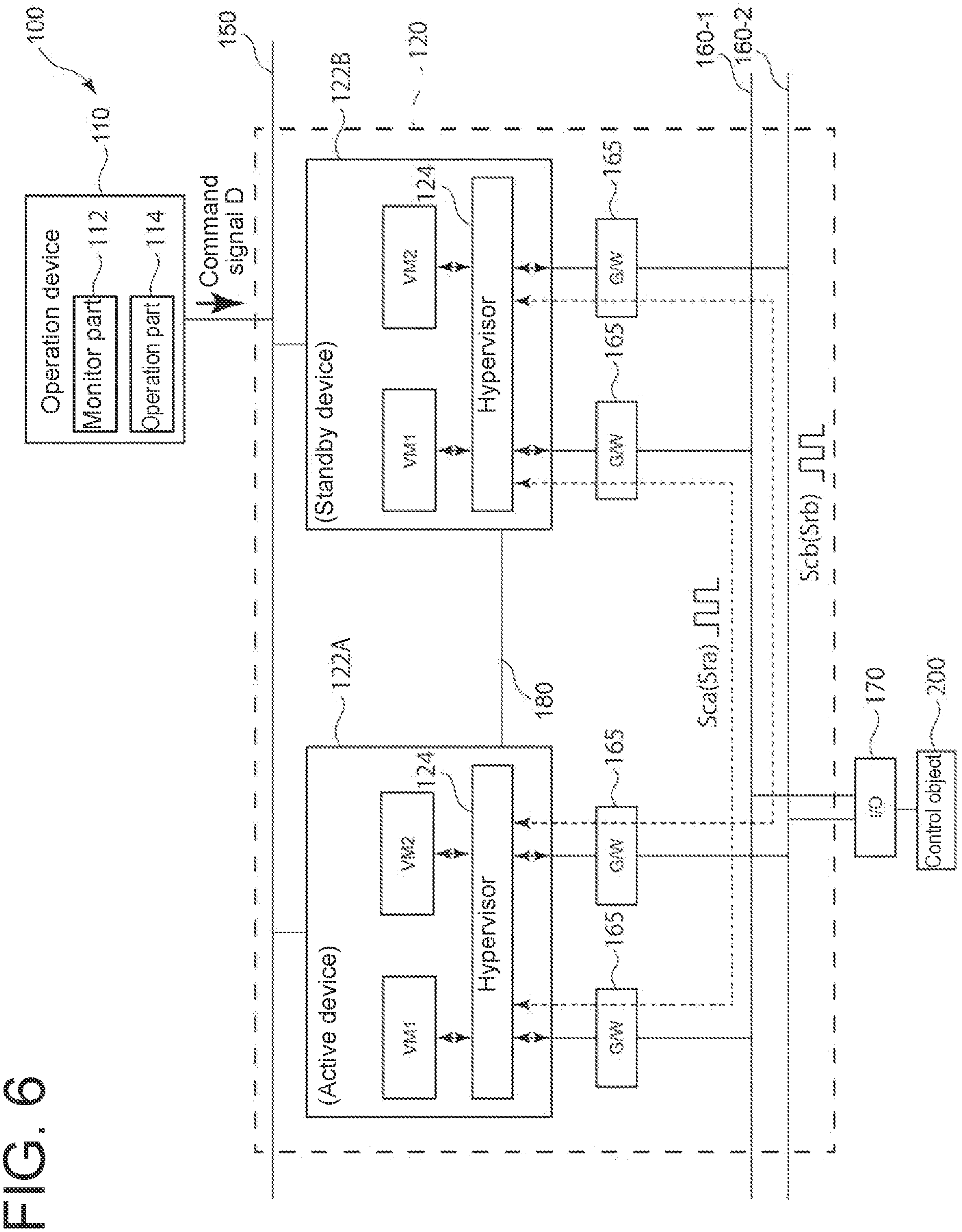
FIG. 6 is an overall configuration diagram of the control system according to the fourth embodiment.

FIG. 6 is an overall configuration diagram of the control system 100 according to the fourth embodiment. The control system 100 according to the fourth embodiment includes a plurality of mutually independent OT lines respectively corresponding to the plurality of virtual machines of each controller virtualization device. More specifically, the two controller virtualization devices 122A, 122B of the controller virtualization device 120 are mounted with the plurality of VM1, VM2, respectively. Then, the plurality of VM1, VM2 are configured to mutually transmit the existence confirmation signal Sc or the reliability confirmation signal Sr via a mutually independent first OT line 160-1 and second OT line 160-2 respectively corresponding to the plurality of VM1, VM2. That is, the VM1 of the controller virtualization device 122A and the VM1 of the controller virtualization device 122B are connected via the first OT line 160-1, and an existence confirmation signal Sca or a reliability confirmation signal Sra are mutually transmitted via the first OT line 160-1. Further, the VM2 of the controller virtualization device 122A and the VM2 of the controller virtualization device 122B are connected via the second OT line 160-2, and an existence confirmation signal Scb or a reliability confirmation signal Srb are mutually transmitted via the second OT line 160-2.

By thus providing the first OT line 160-1 and the second OT line 160-2 for each of VM1 and VM2 mounted on the plurality of controller virtualization devices 122A, 122B, compared with the case where the single OT line 160 is provided as in the aforementioned embodiment, it is possible to improve resistance to the fault such as the occurrence of the disconnection in the connection cable that constitutes the OT line. Further, mutual interference of the control signals S from the respective VM1, VM2 can be avoided between the input/output device 170 and each of the controller virtualization devices 122A, 122B, improving responsiveness and obtaining excellent real-time performance. Furthermore, since the existence confirmation signal Sc or the reliability confirmation signal Sr is mutually transmitted and received via the plurality of OT lines 160-1, 160-2, the dedicated circuit using the FPGA or the like becomes unnecessary, which is required when the existence confirmation signal Sc or the reliability confirmation signal Sr is mutually transmitted and received between the plurality of controller virtualization devices 122A and 122B via the IT network 150 or the inter-device connection network 180 connecting between the plurality of controller virtualization devices 122A and 122B.

Figure 7:
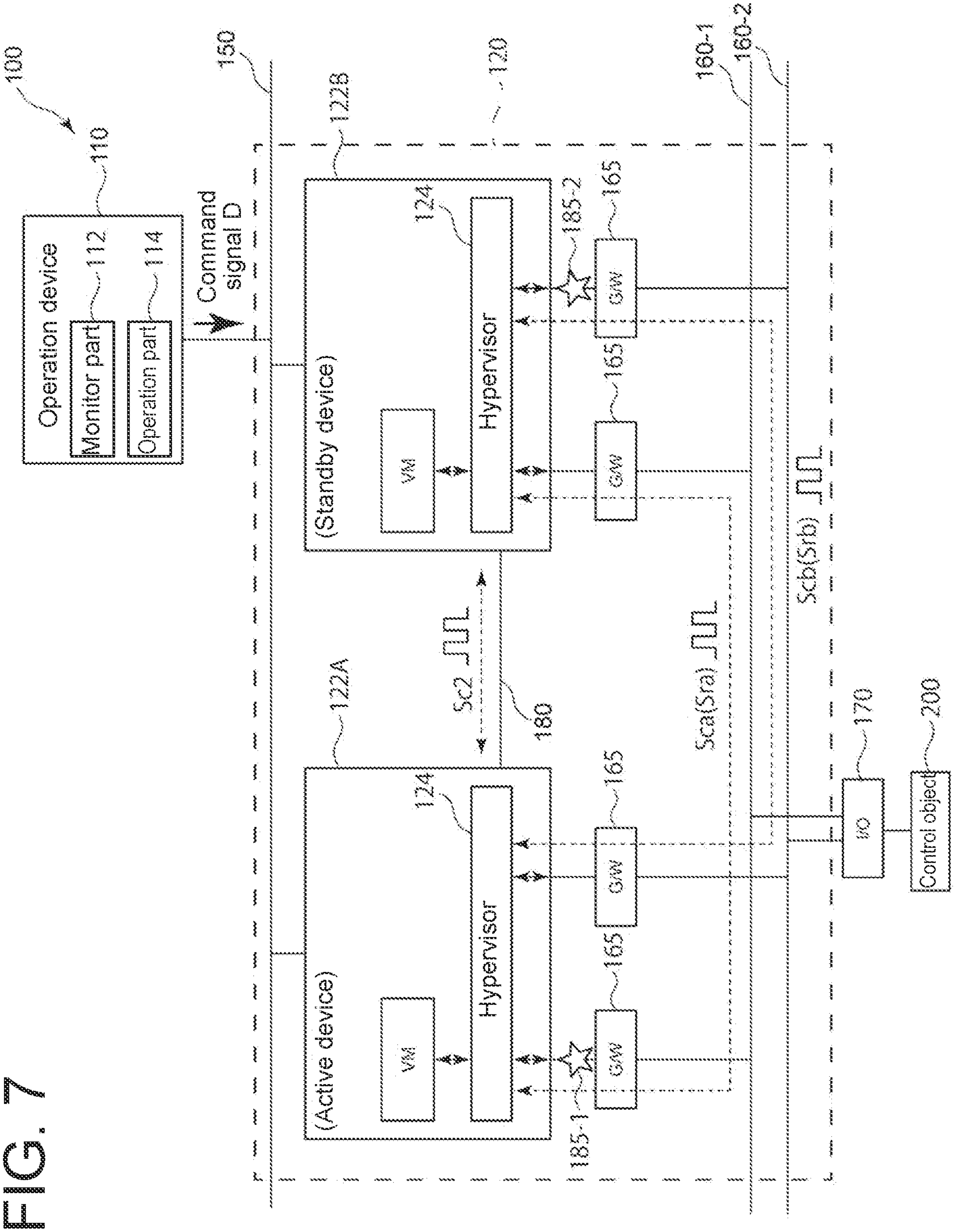
FIG. 7 is a diagram showing a situation in which double failures occur in the control system of FIG. 6.

FIG. 7 is an overall configuration diagram of the control system 100 according to the fifth embodiment, in FIG. 7, whereas each of the controller virtualization devices 122A, 122B includes the one VM, the duplicated first OT line 160-1 and second OT line 160 are provided as the OT lines through which the control signals from the respective VMs are transmitted, thereby improving fault tolerance. In such configuration, the controller virtualization devices 122A, 122B mutually transmit the existence confirmation signal Sca via first OT line 160-1, and mutually transmit the existence confirmation signal Scb via the second OT line 160-2.

In the embodiment shown in FIG. 7, the case has been exemplified where the controller virtualization devices 122A, 122B each include the one VM. However, the same also applies to the configuration where the controller virtualization devices 122A, 122B include the plurality of VMs, respectively, and the OT line 160 is duplicated.

FIG. 7 shows the case where, in such configuration, double failures occur which include a first location of failure 185-1 occurring on the controller virtualization device 122A side in the first OT line 160-1 and a second location of failure 185-2 occurring on the controller virtualization device 122B side in the second OT line 160-2. If such double failures occur, the existence confirmation signals Sca and Scb cannot mutually be transmitted between the two controller virtualization devices 122A and 122B, which may result in both of the two controller virtualization devices 122A, 122B becoming the active devices. In this case, in the input/output device 170, the control signals S from the two controller virtualization devices 122A, 122B conflict with each other, resulting in unstable control.

In the present embodiment, if such double failures occur, as shown in FIG. 7, it is configured such that the second existence confirmation signal Sc2 can be transmitted between the two controller virtualization devices 122A and 122B via the inter-device connection network 180. Thus, it is possible to prevent the two controller virtualization devices 122A, 122B from simultaneously becoming the active devices. That is, in the control system 100, if the double failures occur due to the transmission of the existence confirmation signals Sca, Scb via the first OT line 160-1 and the second OT line 160-2, one of the controller virtualization devices 122A, 122B is set as the active device and the other is set as the standby device based on the second existence confirmation signal Sc2 via the inter-device connection network 180. Thus, it is possible to avoid the control signals S from the two controller virtualization devices 122A, 122B from conflicting with each other even in the occurrence of the double failures, and to prevent the control from becoming unstable.

As described above, according to each embodiment described above, by mutually transmitting the existence confirmation signal Sc or the reliability confirmation signal Sr between the plurality of controller virtualization devices via the OT line 160 for outputting the control signal S from the controller virtualization device 120, it is possible to realize the control device with high functionality and excellent reliability while suppressing the manufacturing cost. Further, even if the end of life (EOL) of the previous version associated with the version upgrade cycle occurs in the electronic component constituting the hardware, it is possible to effectively reduce the development cost associated with the design change.

The contents described in the above embodiments would be understood as follows, for instance.

(1) A controller virtualization device (such as the controller virtualization device 120 of the above-described embodiment) according to one aspect includes: a plurality of controller virtualization devices (such as the controller virtualization devices 122A, 122B, 122C of the above-described embodiment) each configured to generate a control signal (such as the control signal S of the above-described embodiment) for a control object (such as the control object 200 of the above-described embodiment) and including at least one virtual machine (such as the VM of the above-described embodiment); and at least one OT line (such as the OT line 160 of the above-described embodiment) for transmitting the control signal from each of the plurality of controller virtualization devices to the control object. The plurality of controller virtualization devices are configured to mutually transmit and receive an existence confirmation signal (such as the existence confirmation signal Sc of the above-described embodiment) or a reliability confirmation signal (such as the reliability confirmation signal Sr of the above-described embodiment) of the virtual machine via the at least one OT line.

With the above aspect (1), the control device is configured such that the existence confirmation signal or the reliability confirmation signal is mutually transmitted and received between the plurality of controller virtualization devices via the OT line. Consequently, for example, if the failure (disconnection of the cable related to a path that includes the OT line and the controller virtualization device outputting the control signal to the control object via the OT line, breakdown of the communication chip or the communication device, etc.) occurs on the path, the controller virtualization device detects the disconnection of its own control output line and leaves the control and another controller virtualization device can instead output the control signal for the control object via the OT line. Thus, since it is configured such that the existence confirmation signal or the reliability confirmation signal is mutually transmitted and received between the plurality of controller virtualization devices via the OT line, the dedicated circuit using the FPGA or the like becomes unnecessary, which is required when the existence confirmation signal or the reliability confirmation signal is mutually transmitted and received between the plurality of controller virtualization devices via an IT network or an inter-device connection network connecting between the plurality of controller virtualization devices. As a result, even if the electronic component constituting the hardware of the control device is forced to change the design due to the end of life (EOL) of the previous version associated with the version upgrade cycle, it is possible to effectively reduce the development cost required of the control device.

(2) In another aspect, in the above aspect (1), the controller virtualization device is configured to transmit, to the control object, the control signal which is generated by the controller virtualization device selected as an active device from among the plurality of controller virtualization devices based on the existence confirmation signal or the reliability confirmation signal.

With the above aspect (2), the control signal from the active device selected from among the plurality of controller virtualization devices based on the existence confirmation signal or the reliability confirmation signal is transmitted to the control object. If the failure occurs in the path including the OT line and the controller virtualization device which is the thus selected active device, in each controller virtualization device, the controller virtualization device that has not been selected as the active device (that is, has been selected as the standby device) is switched to the active device based on the transmission/reception status of the existence confirmation signal or the reliability confirmation signal on the OT line, as described above, (3) In another aspect, in the above aspect (2), the controller virtualization device is configured to select, as the active device, the controller virtualization device whose existence is confirmed from among the plurality of controller virtualization devices based on the existence confirmation signal.

With the above aspect (3), the plurality of controller virtualization devices select the controller virtualization device whose existence is confirmed as the active device based on the existence confirmation signal mutually transmitted and received via the OT line, and the control signal generated by said controller virtualization device is transmitted to the control object. On the other hand, the controller virtualization device that has not been selected as the active device functions as the standby device and, stands by in a state switchable to the active device when the failure occurs on the path that includes and the OT line and the controller virtualization device selected as the active device. Thus, since the active device and the standby device are switched based on the existence confirmation signal via the OT line even when the failure occurs, it is possible to realize the control device having the highly reliable redundant configuration.

(4) In another aspect, in the above aspect (2), the controller virtualization device is configured to select, as the active device, the controller virtualization device whose reliability is confirmed from among the plurality of controller virtualization devices based on the reliability confirmation signal.

With the above aspect (4), the plurality of controller virtualization devices select the controller virtualization device whose reliability is confirmed as the active device based on the reliability confirmation signal mutually transmitted and received via the OT line, and the control signal generated by said controller virtualization device is transmitted to the control object. For example, the reliability confirmation signal includes information parameters regarding the reliability of the plurality of controller virtualization devices, and by comparing these parameters, the reliability of each controller virtualization device may be determined by so-called majority decision or the controller virtualization device whose parameter is not less than a reference value may be determined as reliable. Whereby, by transmitting the control signal from the controller virtualization device whose reliability is guaranteed to the control object, it is possible to realize the control device having the highly reliable multiplexed configuration.

(5) In another aspect, in any one of the above aspects (2) to (4), the controller virtualization device is configured to output an emergency stop control signal (such as the emergency stop control signal Ss of the above-described embodiment) to the control object, if the controller virtualization device does not exist which corresponds to the active device based on the existence confirmation signal or the reliability confirmation signal.

With the above aspect (5), if there is no controller virtualization device to be the active device, the emergency stop signal is output to the control object, and the control object is subjected to emergency stop control. Thus, since the unintended control signal is output to the control object, it is possible to effectively prevent the occurrence of the problem caused by the failure, (6) In another aspect, in any one of the above aspects (2) to (5), each of the plurality of controller virtualization devices is configured to operate so as to reproduce an operating state before a previous stop at startup, and the plurality of controller virtualization devices have different startup timings, if the operating state before the previous stop of each of the plurality of controller virtualization devices is the active device.

With the above aspect (6), it is controlled such that the operating state of the controller virtualization device reproduces the operating state before (immediately before) the previous stop at startup. In such a case, even if the operating states before the previous stop of the plurality of controller virtualization devices are all the active devices, since the plurality of controller virtualization devices have the different startup timings, it is possible to avoid the plurality of controller virtualization devices from simultaneously becoming the active devices at startup and to prevent the control from becoming unstable.

(7) In another aspect, in any one of the above aspects (1) to (6), the plurality of controller virtualization devices include the plurality of virtual machines, respectively.

With the above aspect (7), fir example, by creating the plurality of virtual machines on a single piece of hardware through execution of virtualization software, the plurality of virtual machines are mounted on in each of the plurality of controller virtualization devices. By thus mounting the plurality of virtual machines on the single physical controller, it is possible to realize the plurality of controller functions, and it is possible to effectively suppress the manufacturing cost of the control device.

(8) In another aspect, in the above aspect (7), the at least one OT line includes a plurality of mutually independent OT lines (such as the first OT line 160-1 and the second OT line 160-2 of the above-described embodiment) respectively corresponding to the plurality of virtual machines.

With the above aspect (8), if the plurality of virtual machines are mounted on each controller virtualization device, the plurality of OT lines corresponding to the respective virtual machines may be provided. In this case, since the existence confirmation signal or the reliability confirmation signal is mutually transmitted and received via the plurality of OT lines, the dedicated circuit using the FPGA or the like becomes unnecessary, which is required when the existence confirmation signal or the reliability confirmation signal is mutually transmitted and received between the plurality of controller virtualization devices via the IT network or the inter-device connection network connecting between the plurality of controller virtualization devices.

(9) In another aspect, in any one of the above aspects (1) to (6), the plurality of controller virtualization devices each include the one virtual machine, the at least one OT line includes a plurality of mutually independent OT lines, and the controller virtualization device is configured to transmit, to the control object, the control signal which is transmitted via an inter-device connection network disposed between the plurality of controller virtualization devices and is generated by the controller virtualization device selected based on a second existence confirmation signal indicating an operating state of each of the plurality of controller virtualization devices, if a failure occurs in each of the plurality of OT lines.

With the above aspect (9), in the case where each controller virtualization device includes the virtual machine and is duplicated by the plurality of OT lines to improve fault tolerance, in the occurrence of the failure in each of the plurality of OT lines, that is, a so-called the occurrence of double failures, the controller virtualization device is configured to select, based on the second existence confirmation signal mutually transmitted via the inter-device connection network, the controller virtualization device for transmitting the control signal to the control object. In the occurrence of the double failures, the case is considered in which it is difficult to transmit and receive the existence confirmation signal or the reliability confirmation signal via the OT line between the plurality of controller virtualization devices. However, even in such a case, by selecting the controller virtualization device, which is to transmit the control signal to the control object, based on the second existence confirmation signal mutually transmitted via the inter-device connection network, it is possible to effectively avoid unstable control caused by the conflict between the control signals from the plurality of controller virtualization devices.

(10) In another aspect, in any one of the above aspects (1) to (9), the existence confirmation signal or the reliability confirmation signal includes at least either of an operating state or the number of operation counts of the controller virtualization device, or an operating state or the number of operation counts of the virtual machine.

With the above aspect (10), even if the process of exchanging the existence confirmation signal or the reliability confirmation signal with the control application is configured in a separate process (or thread), it is possible to transmit the operating state of the control application to the partner device. In particular, since the existence confirmation signal or the reliability confirmation signal includes the operating state of the virtual machine, it is possible to individually determine and process the states of the plurality of virtual machines. Further, the number of counts is regarded as a sequence number of a transmitted packet, and if the OT line is made redundant, a packet received earlier than a packet transmitted at the same timing is processed and the packet received later is discarded, making it possible to prevent double processing of the existence confirmation signal or the reliability confirmation signal.

(11) A control system according to one aspect includes: the controller virtualization device according to any one of the above aspects (1) to (10).

With the above aspect (11), it is possible to realize a control system that can stably control a control object regardless of a failure occurrence mode and has excellent high availability.

REFERENCE SIGNS LIST

100 Control system
110 Operation device
112 Monitor part
114 Operation part
120 Controller virtualization device
122A, 122B, 122C Controller virtualization device
124 Hypervisor
150 IT network
160 OT line
160-1 First OT line
160-2 Second OT line
165 Gateway device
170 Input/output device
180 Inter-device connection network
185 Location of failure
185-1 First location of failure
185-2 Second location of failure

The invention claimed is:

1. A controller virtualization device, comprising:

a plurality of virtualization devices each configured to generate a control signal for a control object and including at least one virtual machine; and at least one OT line for transmitting the control signal from each of the plurality of virtualization devices to the control object, wherein the plurality of virtualization devices are configured to mutually transmit and receive an existence confirmation signal which is communication data for confirming mutual operating states by being mutually transmitted and received between the plurality of virtualization devices or a reliability confirmation signal of a respective one of the at least one virtual machine included in the plurality of virtualization devices including information parameters regarding reliability of the plurality of virtualization devices via the at least one OT line, wherein the controller virtualization device is configured to transmit, to the control object, the control signal which is generated by the virtualization device selected as an active device from among the plurality of virtualization devices based on the existence confirmation signal or the reliability confirmation signal, and wherein the controller virtualization device is configured to control an input/output device connected between the OT line and the control object to output an emergency stop control signal to the control object via the OT line, if all of the plurality of virtualization device are switched to standby devices when failures occur in all of the plurality of virtualization device based on the existence confirmation signal or the reliability confirmation signal.

2. The controller virtualization device according to claim 1, wherein the controller virtualization device is configured to select, as the active device, the virtualization device whose existence is confirmed from among the plurality of virtualization devices based on the existence confirmation signal.

3. The controller virtualization device according to claim 1, wherein the controller virtualization device is configured to select, as the active device, the virtualization device whose reliability is confirmed from among the plurality of virtualization devices based on the reliability confirmation signal.

4. The controller virtualization device according to claim 1, wherein each of the plurality of virtualization devices is configured to operate so as to reproduce an operating state before a previous stop at startup, and wherein the plurality of virtualization devices have different startup timings, if the operating state before the previous stop of each of the plurality of virtualization devices is the active device.

5. The controller virtualization device according claim 1, wherein each of the plurality of virtualization devices includes a plurality of virtual machines as the at least one virtual machine, respectively.

6. The controller virtualization device according to claim 5, wherein the at least one OT line includes a plurality of mutually independent OT lines respectively corresponding to the plurality of virtual machines.

7. The controller virtualization device according to claim 1, wherein the at least one OT line includes a plurality of mutually independent OT lines, and wherein the virtualization device is configured to transmit, to the control object, the control signal which is transmitted via an inter-device connection network disposed between the plurality of virtualization devices and is generated by the virtualization device selected based on a second existence confirmation signal indicating an operating state of each of the plurality of virtualization devices, if a failure occurs in each of the plurality of OT lines.

8. The controller virtualization device according to claim 1, wherein the existence confirmation signal or the reliability confirmation signal includes at least either of an operating state or the number of operation counts of the virtualization device, or an operating state or the number of operation counts of the respective virtual machine.

9. A control system, comprising:

the controller virtualization device according to claim 1.

10. A controller virtualization device, comprising:

a plurality of virtualization devices each configured to generate a control signal for a control object and including at least one virtual machine; and at least one OT line for transmitting the control signal from each of the plurality of virtualization devices to the control object, wherein the plurality of virtualization devices are configured to mutually transmit and receive an existence confirmation signal which is communication data for confirming mutual operating states by being mutually transmitted and received between the plurality of virtualization devices or a reliability confirmation signal of a respective one of the at least one virtual machine included in the plurality of virtualization devices including information parameters regarding reliability of the plurality of virtualization devices via the at least one OT line, wherein the at least one OT line includes a plurality of mutually independent OT lines, and wherein the virtualization device is configured to transmit, to the control object, the control signal which is transmitted via an inter-device connection network disposed between the plurality of virtualization devices and is generated by the virtualization device selected based on a second existence confirmation signal indicating an operating state of each of the plurality of virtualization devices, if a failure occurs in each of the plurality of OT lines.

* * * * *